Jan. 23, 1923.
H. MISCAMPBELL.
POWER SNOWPLOW.
FILED DEC. 26, 1919.
1,443,032
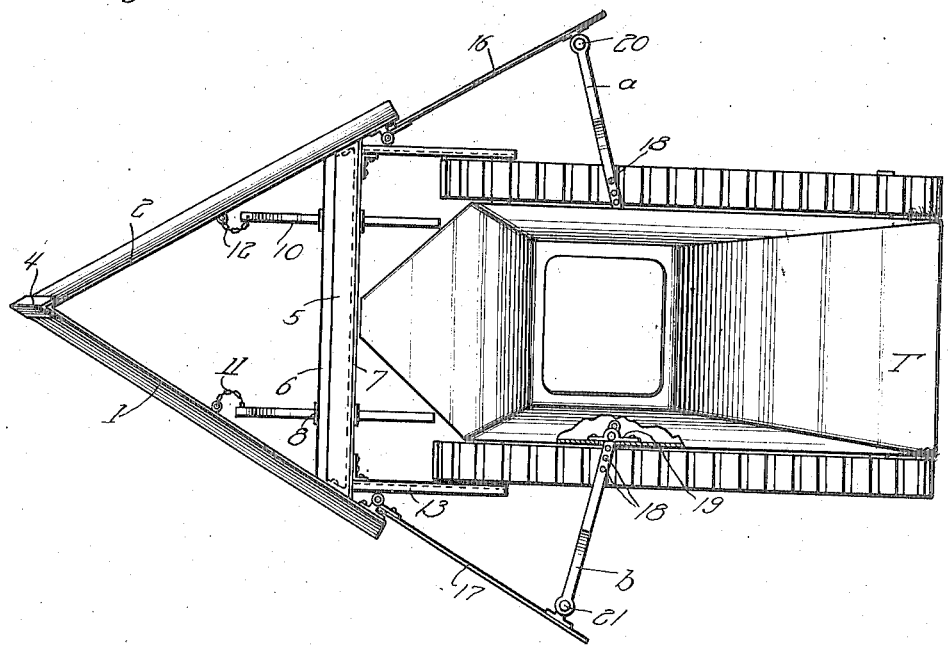
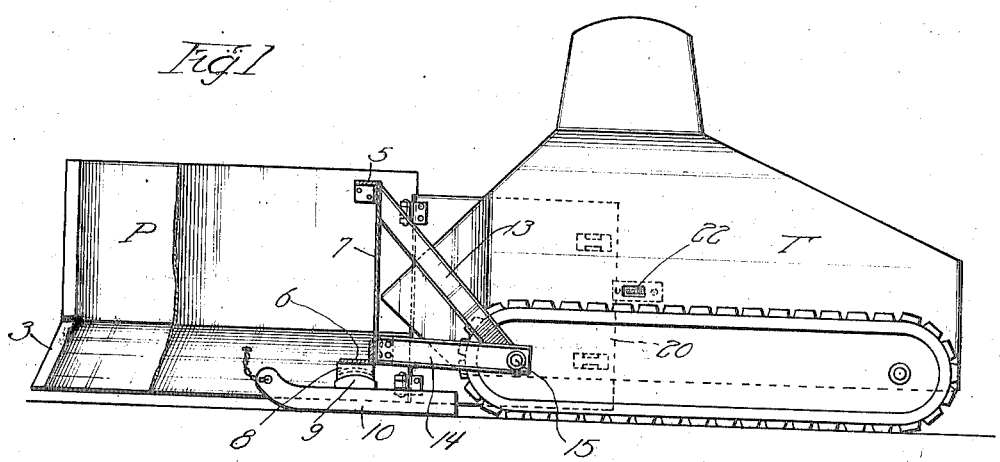
Inventor
Hugh Miscampbell
by Wallace R. Lane
Atty

Patented Jan. 23, 1923.

1,443,032

UNITED STATES PATENT OFFICE.

HUGH MISCAMPBELL, OF DULUTH, MINNESOTA.

POWER SNOWPLOW.

Application filed December 26, 1919. Serial No. 347,326.

*To all whom it may concern:*

Be it known that I, HUGH MISCAMPBELL, a citizen of the United States, residing at Duluth, in the county of St. Louis and State of Minnesota, have invented certain new and useful Improvements in Power Snowplows, of which the following is a specification.

This invention relates to snow plows, and more particularly to such as applied to a self-propelled vehicle of sufficient power to operate the plow through heavy snows.

Among the objects of this invention are to provide a snow plow capable of successfully and readily handling heavy snows; further to make the snow plow removable from the body of the self-propelled vehicle or tractor to permit the tractor to be operated in its ordinary capacity, when desired; to so arrange the plow with relation to the tractor or self-propelled vehicle that it will be self-supporting; to produce a snow plow adjustable in width so that wider or narrower paths may be cleared as desired; to so position and connect the plow with relation to the tractor that it may be handled with greatest ease and maximum efficiency; to provide a more efficacious plow of the class described, and also one that is simple and economical in construction and operation; and such further objects, advantages and capabilities as will later more fully appear.

My invention further resides in the combination, construction and arrangement of parts illustrated in the accompanying drawings, and while I have shown therein a preferred embodiment, I desire it to be understood that the same is susceptible of modification and change without departing from the spirit of my invention.

In the drawings:

Fig. 1 is a side elevation of one form of tractor with my plow attached thereto, the plow being shown partly in section for the sake of clearness.

Fig. 2 is a plan view of Fig. 1, except to show the plow in its entirety.

In those parts of the country having heavy snowfalls, the matter of quickly and efficiently handling such snows is quite a serious matter. The depth of the snow is many times so great that the use of horses would be impracticable, and the attachment of a plow behind a tractor would not be feasible, since the tractor would itself become stalled in the snow. To overcome these difficulties I have devised the snow plow forming the subject of this application.

Referring to the drawings:

My plow is shown as attached to a tractor of the caterpillar type. The particular form of tractor chosen for this illustration being what is commonly known as "whippet tank." It is, of course, to be understood that I do not wish to be limited to this particular form of self-propelled vehicle or tractor, since my plow is capable of application to other forms of tractor without departing from my inventive idea.

In the drawings the plow proper is designated at P, and the tractor as T, the former being pivotally secured to the latter to permit oscillating movement of the plow in a vertical direction to accommodate any unevenness of the supporting surface. The plow comprises the main cheek plates 1 and 2, which extend forward at a suitable angle as indicated at 3, to more effectively turn the snow outwardly. A suitable nose piece is attached to the apex of the plow for strengthening purposes, and for diverting any hard substances that may be encountered. The cheek plates 1 and 2 are rigidly secured in proper angularity to each other by an open frame work near their rear end, which frame work comprises the angle bars 5 and 6, and the vertically extending member 7. The angle bar 6 as shown in Fig. 1 rests upon the block 8, which in turn is carried by block 9, the upper surface of which is formed in the arc of a circle to permit sliding movement with the lower face of block 8, which is similarly curved, and which blocks may be held against accidental separation in any convenient manner. Blocks 9 in turn rest upon the runners 10, and bear thereon at a point intermediate of their length. This construction renders the plow self-supporting, but I wish it to be understood that, if desired, other forms of supporting means may be used, such for example, as wheels. In order to prevent the runners from becoming separated from the plow, the front end thereof is secured to the inner face of plates 1 and 2, by means of chains 11 and 12.

Extending rearwardly, and suitably secured to the plow, are the bars 13 and 14, which at their rear ends are provided with suitable openings to fit over the axles 15, as shown in Fig. 1. This construction permits a pivotal movement of the plow on the axle 15 to permit the sled runners to pass over any uneven places in the snow or ground, without straining or distorting the plow with relation to the tractor. Hinged to the rear end portion of each of plates 1 and 2 are the extension plates 16 and 17, which are in turn supported away from the sides of the tank by means of bars $a$ and $b$, which are in turn provided with a plurality of openings 18, through any one of which may be passed a pin taking into a suitable bracket 19, mounted on the inside of the tank. By having a plurality of openings 18, the distance of the plates 16 from the tank may be adjusted to permit the same to be set for a wide or narrow path, as desired. The outer end of bars $a$ and $b$ are hinged at 20 and 21 to the rear end of extension plates 16 and 17 to accommodate this increasing or decreasing of the width in an obvious manner. The sides of the tank have formed therein the openings 22, of sufficient size to permit bars $a$ and $b$ to pass freely therethrough.

It is of importance to note that the plow is supported on two or three point bearings, is self-supporting, is oscillatable with relation to the tractor to accommodate for any unevenness in the road, and is pushed by power instead of being drawn.

It will thus be seen that I have provided a construction that is powerful in operation, simple to manipulate, and will readily and successfully handle snows of great depth.

Having now described my invention, I claim:

In a structure of the character described, a self propelling vehicle having securing means at the sides thereof, a self supporting snow plow secured to one end of the vehicle against lateral turning but capable of vertical oscillation according to the surface traversed, laterally adjustable plates secured to the sides of the plow and capable of having their inclination varied to vary the width of path cleared and braces pivotally connected to the plates and adjustably connected to said securing means.

In witness whereof, I hereunto subscribe my name to this specification in the presence of two witnesses.

HUGH MISCAMPBELL.

Witnesses:
W. H. BONNELL,
HELEN A. GARDNER.